US012579161B2

(12) United States Patent
Lee

(10) Patent No.: US 12,579,161 B2
(45) Date of Patent: Mar. 17, 2026

(54) ETL JOB DISTRIBUTED PROCESSING SYSTEM AND METHOD BASED ON DYNAMIC CLUSTERING

(71) Applicant: ARI SYSTEM BLUE CO., LTD., Seoul (KR)

(72) Inventor: Kil Sik Lee, Paju-si (KR)

(73) Assignee: ARI SYSTEM BLUE CO., LTD., Seoul (KR)

( * ) Notice: Subject to any disclaimer, the term of this patent is extended or adjusted under 35 U.S.C. 154(b) by 0 days.

(21) Appl. No.: 19/188,542

(22) Filed: Apr. 24, 2025

(65) Prior Publication Data

US 2025/0252114 A1      Aug. 7, 2025

Related U.S. Application Data

(63) Continuation of application No. PCT/KR2023/006701, filed on May 17, 2023.

(30) Foreign Application Priority Data

Nov. 18, 2022     (KR) ......................... 10-2022-0155678

(51) Int. Cl.
      *G06F 16/25*          (2019.01)
      *G06F 16/27*          (2019.01)
(52) U.S. Cl.
      CPC ............. *G06F 16/254* (2019.01); *G06F 16/27* (2019.01)
(58) Field of Classification Search
      CPC ............................... G06F 16/254; G06F 16/27
      See application file for complete search history.

(56) References Cited

U.S. PATENT DOCUMENTS

| 10,367,676 | B1 * | 7/2019 | Vermeulen | .............. H04L 41/30 |
| 10,810,093 | B1 * | 10/2020 | Tucek | ................. H04L 41/0893 |
| 12,131,176 | B2 * | 10/2024 | Todorov | .............. G06F 9/45558 |
| 2005/0071842 | A1 * | 3/2005 | Shastry | ................. G06F 9/5038 |
| | | | | 718/100 |
| 2019/0318123 | A1 * | 10/2019 | Greene | ................. G06F 16/183 |

(Continued)

FOREIGN PATENT DOCUMENTS

| JP | 2004-519024 A | 6/2004 |
| KR | 10-2005-0064766 A | 6/2005 |
| KR | 10-1090890 B1 | 12/2011 |

(Continued)

OTHER PUBLICATIONS

Office Action of KIPO, issued on Dec. 21, 2022.

(Continued)

*Primary Examiner* — Khanh B Pham
(74) *Attorney, Agent, or Firm* — ZION IP; Byungwoong Park

(57)          ABSTRACT

According to an embodiment of the disclosure, an ETL JOB distributed processing method based on dynamic clustering includes: extracting, by a cluster leader node, data from a source DB; distributing, by the cluster leader node, an ETL (Extract, Transform, Load) JOB for performing an ETL operation to a plurality of cluster normal nodes based on the extracted data; processing, by the plurality of cluster normal nodes, the ETL JOB by calling the cluster leader node; and loading, by the cluster leader node and the plurality of cluster normal nodes, the processed ETL JOB into a target DB.

4 Claims, 4 Drawing Sheets

(56)     References Cited

U.S. PATENT DOCUMENTS

2023/0104101 A1\*    4/2023   Rodriguez .......... G06F 9/44521
                                            707/602
2024/0071607 A1\*    2/2024   Li ........................ G06F 16/254

FOREIGN PATENT DOCUMENTS

KR      10-2012-0074528  A      7/2012
KR           10-1806497  B1    12/2017
KR           10-2038527  B1    11/2019
KR           10-2507481  B1     3/2023
WO         2024-106644  A1     5/2024

OTHER PUBLICATIONS

Notice of Allowance of KIPO, issued on Feb. 27, 2023.
International Search Report for PCT/KR2023/006701, Aug. 17, 2023.

\* cited by examiner

ETL JOB DISTRIBUTED PROCESSING SYSTEM AND METHOD BASED ON DYNAMIC CLUSTERING

TECHNICAL FIELD

The present invention relates to a dynamic clustering-based ETL JOB distributed processing system and method. In particular, the present invention relates to the dynamic clustering-based ETL JOB distributed processing system and the method, which can configure a multiplexed ETL system and use 100% of available resources, and dynamically support a high availability cluster even in the configuration of the multiplexed ETL, thereby ensuring not only a high availability cluster (H/A) configuration but also scalability.

BACKGROUND

ETL (Extract, Transform, Load) is a three-step process in which data is extracted, transformed, and loaded, and ETL software automates the entire process and can be executed manually or processed as a batch operation according to a repeated schedule.

Generally, an ETL system operates alone or supports a high availability cluster (H/A) service in an Active-Standby duplex manner. At this time, one unit is configured as an active state for processing the actual ETL, and the other unit is configured as a standby state, and when the active server fails, the standby server is operated in the active mode by the high availability software (dualization solution) to process the ETL.

Such an Active-Standby duplexing scheme has a limitation in that available resources are limited to 50% in terms of configuration characteristics.

As a prior art, there is Korean patent No. 10-1806497 (a middleware device and a method thereof for performing ETL job processes in a distributed manner), but a system configuration in which a separate server (an ETL JOB distributed management server) for performing ETL JOB distribution is configured, and JOBs are distributed to a plurality of ETL servers using the server is supported, but this is not an H/A configuration, but a modified structure focusing on a JOB distributed processing function. If an 'ETL JOB distributed management server' failure occurs, the JOB cannot be distributed and the ETL function cannot be performed.

In particular, for two or more active/active multiplexed ETL system configurations, functional requirements such as multiple system configurations, data sharing and communication, node management, debugging and monitoring, etc., need to be taken into consideration in architectural design from the software design stage.

SUMMARY

Technical Problems

The problem to be solved by the present invention is to provide a dynamic clustering-based ETL JOB distributed processing system and method capable of dynamically supporting a high availability cluster (H/A) in a multiplexed ETL system configuration environment as well as ensuring scalability so that 100% of available resources can be used.

Technical Solution

According to an embodiment of the disclosure, an ETL JOB distributed processing method based on dynamic clustering includes: extracting, by a cluster leader node, data from a source DB; distributing, by the cluster leader node, an ETL (Extract, Transform, Load) JOB for performing an ETL operation to a plurality of cluster normal nodes based on the extracted data; processing, by the plurality of cluster normal nodes, the ETL JOB by calling the cluster leader node; and loading, by the cluster leader node and the plurality of cluster normal node, the processed ETL JOB into a target DB.

An ETL JOB distributed processing system based on dynamic clustering according to an embodiment of the present invention includes: a cluster leader node that receives data extracted from a source DB and distributes an ETL (Extract, Transform, Load) JOB for performing an ETL operation to a plurality of cluster normal nodes; and a plurality of cluster normal nodes that process the ETL JOB by invoking the cluster leader node and a repository DB that stores the ETL JOB processed by the cluster leader node or the plurality of cluster normal nodes.

Effect of Invention

According to the present invention, it is possible to configure a multiplexed ETL system and use 100% of available resources.

In addition, the high availability cluster (H/A) configuration as well as scalability can be guaranteed by dynamically supporting the high availability cluster in the multiplexed ETL system configuration.

BRIEF DESCRIPTION OF THE DRAWINGS

FIG. 3 is a schematic diagram of an ETL JOB distributed processing system based on dynamic clustering according to an embodiment of the present invention.

FIG. 4 is a schematic diagram illustrating an ETL JOB distributed processing system based on dynamic clustering according to an embodiment of the disclosure.

DETAILED DESCRIPTION

Figure 1:
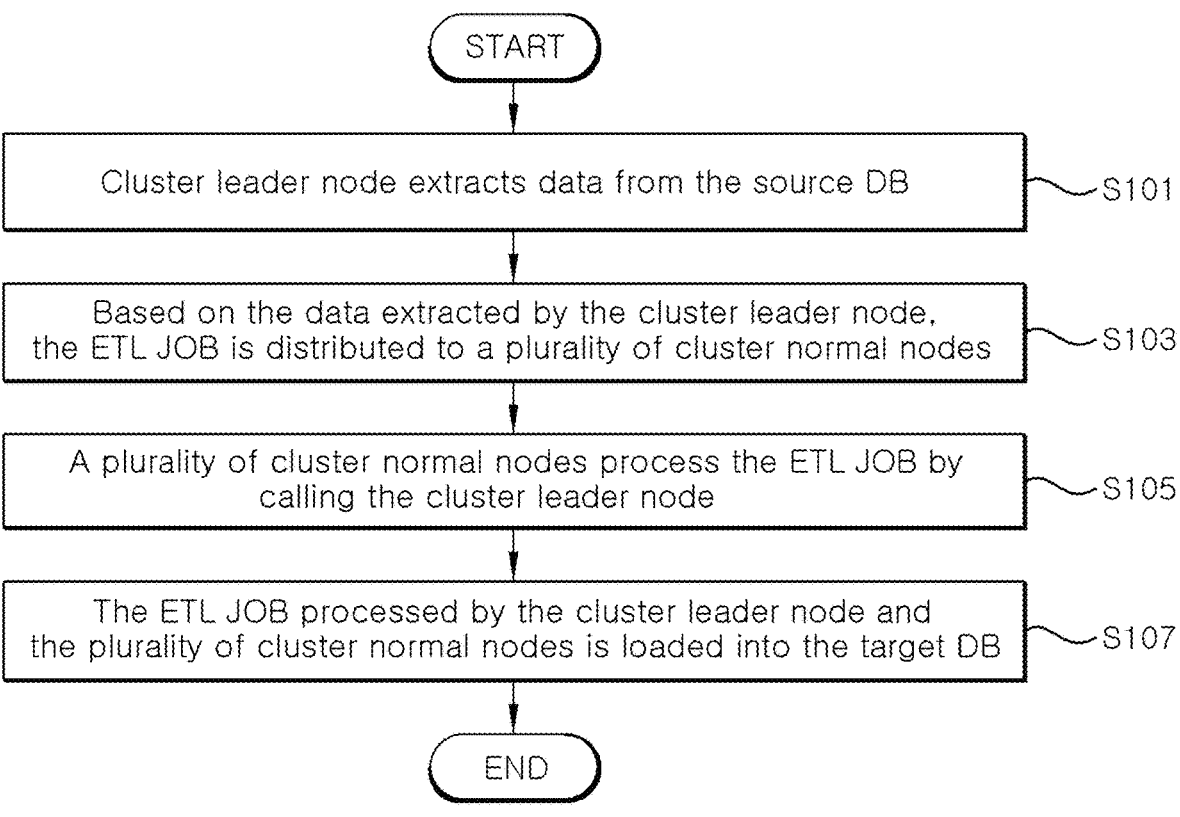
FIG. 1 is a flowchart illustrating a dynamic clustering-based ETL JOB distributed processing method according to an embodiment of the present invention.

The specific structural or functional descriptions of the embodiments in accordance with the present inventive concept disclosed herein are merely illustrative for the purpose of describing the embodiments according to the present inventive concept, and the embodiments in accordance to the present inventive concept may be embodied in various forms and are not limited to the embodiments described herein.

Embodiments in accordance with the inventive concept are capable of various modifications and of various forms, and thus are illustrated in the drawings and described herein in detail. It should be understood, however, that there is no intent to limit embodiments in accordance with the inventive concept to the particular forms disclosed, but on the contrary, the intention is to cover all modifications, equivalents, or alternatives falling within the spirit and scope of the invention.

The terminology used herein is for the purpose of describing particular embodiments only and is not intended to be limiting of the invention. The singular forms "a," "an," and "the" include plural referents unless the context clearly dictates otherwise. It should be understood that terms such as "comprises" or "comprising" used herein are intended to specify the presence of a feature, a number, a step, an operation, a component, a part, or a combination thereof described herein, but do not preclude the presence or addition of one or more other features, numbers, steps, operations, components, parts, or combinations thereof.

The term "cloud" means that data can be stored in a central computer connected to the Internet and can be used anytime, anywhere by simply accessing the Internet, and cloud computing refers to providing IT resources on-demand through the Internet and paying only for the amount used, and the types of cloud services include Iaas (infrastructure), Pass (platform), and Saas (software). Availability refers to the degree to which an information system such as a server, a network, or a program can be normally used. When solubility is expressed by a formula, solubility refers to a value obtained by dividing a normal use time (Uptime) by a total use time (Uptime+Downtime). High solubility is referred to as high availability (HA).

Scalability refers to the ease with which an IT system can be scaled without the need for large-scale redesign and reinstallation. High availability and scalability need to be considered in a service system, and in particular, in a service system in a cloud environment in which a service needs to be provided so as to allow an error and scale according to a customer's requirement, the high availability and the scalability are essential conditions.

In a general clustering method, each node has information of a node configuring clustering, and is referred to as a static clustering configuration. On the other hand, there are cases where nodes need to be dynamically added. That is, a separately set node may be added to the operating cluster, and for this purpose, if all the information of the nodes included in the clustering is set and executed only for the nodes to be dynamically added, the dynamically started node attempts to connect to each node. This is referred to as dynamic clustering, and the present invention relates to an ETL JOB distributed processing system and method based on dynamic clustering. ETL is an abbreviation for Extract, Transform, and Load, and ETL JOB refers to an operation required to perform ETL (Extract, Transform, Load).

Hereinafter, embodiments of the present invention will be described in detail with reference to the accompanying drawings.

FIG. 1 is a flowchart illustrating a dynamic clustering-based ETL JOB distributed processing method according to an embodiment of the present invention.

Referring to FIG. 1, the cluster leader node 100 extracts data from the source DB 400 (S101).

The cluster leader node 100 may manage data communication for clustering, and may extract data to distribute an ETL JOB that performs an extract, transform, and load (ETL) operation in the source DB 400. Based on the data extracted by the cluster leader node 100, the ETL JOB is distributed to a plurality of cluster normal nodes 200 (S103). The cluster leader node 100 may distribute the ETL JOB to a plurality of cluster normal nodes 200 according to the job distribution policy setting, and may call one of the plurality of cluster normal nodes 200 including the cluster leader node 100 according to a predefined condition to distribute the ETL JOB.

A plurality of cluster normal nodes 200 process the ETL JOB by calling the cluster leader node 100 (S105). The ETL JOB processed by the cluster leader node 100 and the plurality of cluster normal nodes 200 is loaded into the target DB 500 (S107).

Figure 2:
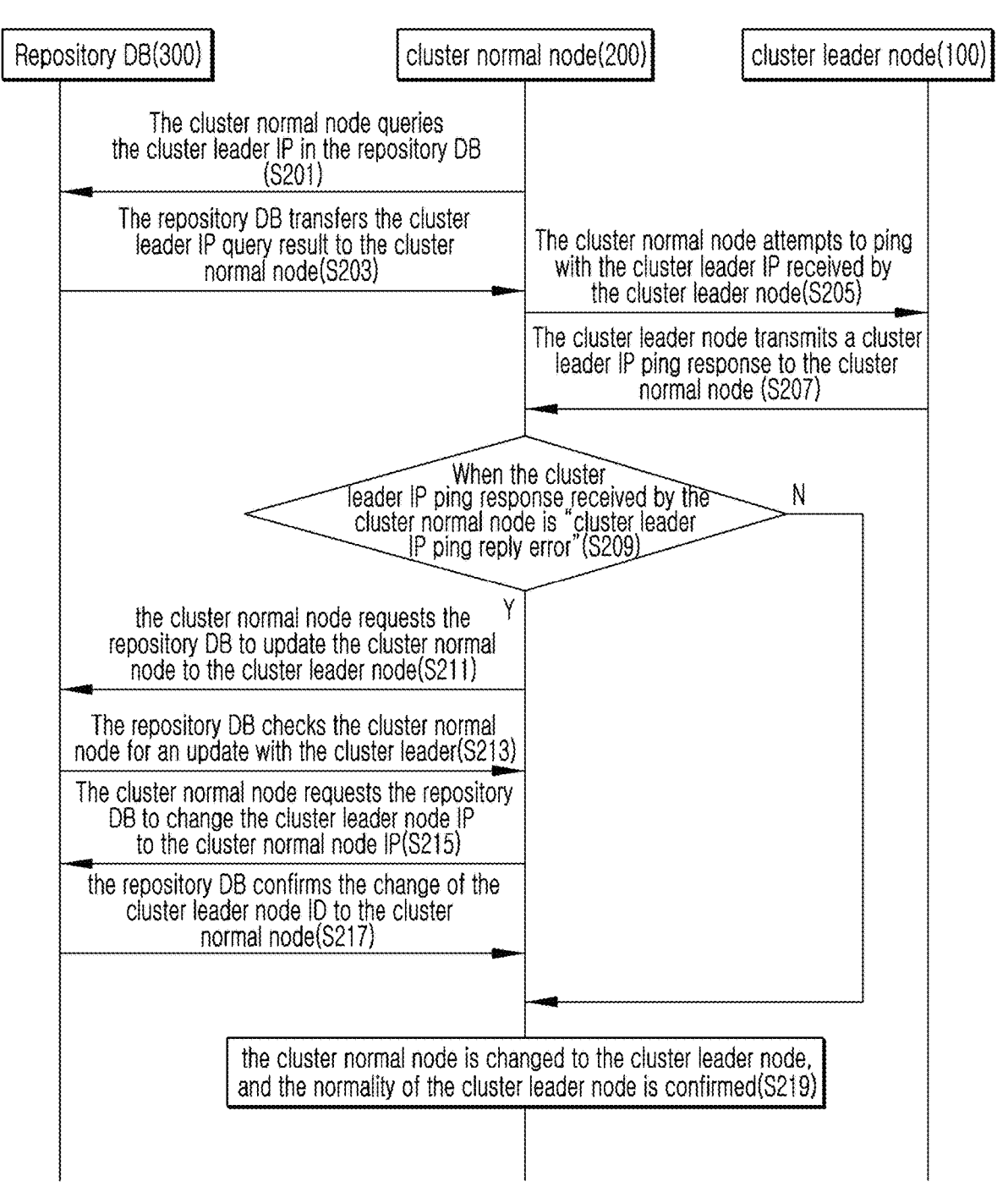
FIG. 2 is a flowchart illustrating a cluster leader node automatic re-selection method in a cluster leader node failure according to an embodiment of the present invention.

FIG. 2 is a flowchart illustrating a cluster leader node automatic re-selection method in the event of a cluster leader node failure according to an embodiment of the present invention.

Referring to FIG. 2, the cluster normal node 200 queries the cluster leader IP in the repository DB 300 (S201), and the repository DB 300 transfers the cluster leader IP query result to the cluster normal node 200 (S203). The cluster normal node 200 attempts to ping with the cluster leader IP received by the cluster leader node 100 (S205), and the cluster leader node 200 transmits a cluster leader IP ping response to the cluster normal node 200 (S207). When the cluster normal node 200 attempts cluster leader IP ping to the cluster leader node 100, three retries may be performed, and if there is no response as a result of the three retries, a "cluster leader IP ping response error" may be transmitted to the cluster normal node 200. When the cluster normal node 200 attempts cluster leader IP ping to the cluster leader node 100, if there is a response among the results of the three retries, the cluster normal node 200 may be notified that it is not a "cluster leader IP ping response error". The above-described number of times of three retries is an example, and is not necessarily limited thereto.

When the cluster leader IP ping response received by the cluster normal node 200 is "cluster leader IP ping reply error" (S209), the cluster normal node 200 requests the repository DB 300 to update the cluster normal node 100 to the cluster leader node 100 (S211). The repository DB 300 checks the cluster normal node 200 for an update with the cluster leader (S213). The cluster normal node 200 requests the repository DB 300 to change the cluster leader node IP to the cluster normal node IP (S215), and the repository DB 300 confirms the change of the cluster leader node ID to the cluster normal node 200 (S217).

If the cluster leader IP ping response received by the cluster normal node 200 from the cluster leader node 100 is "not a cluster leader IP ting response error", the cluster normal node 200 is changed to the cluster leader node 110, and the normality of the cluster leader node 150 is confirmed (S219).

Figure 3:
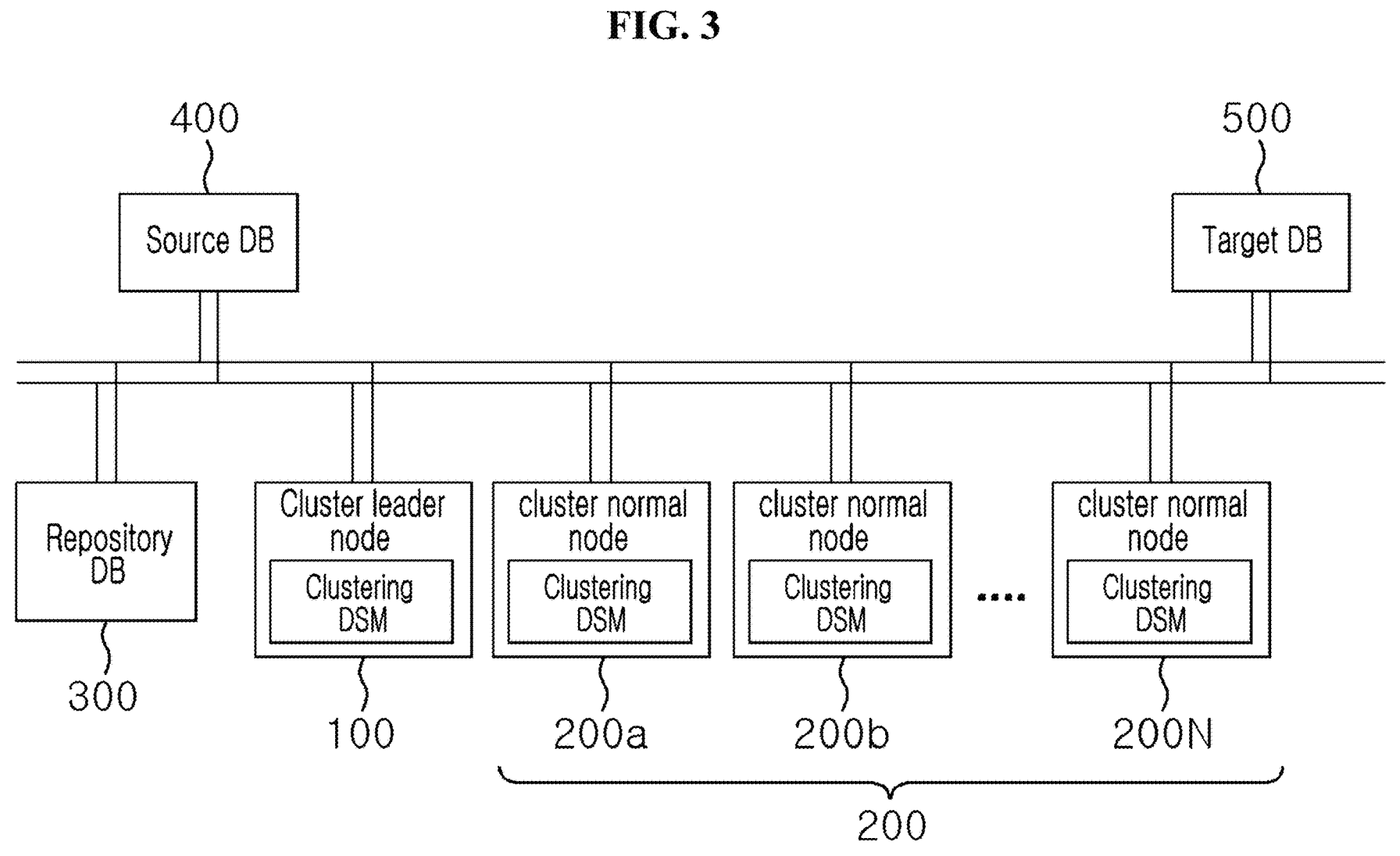
Figure 4:
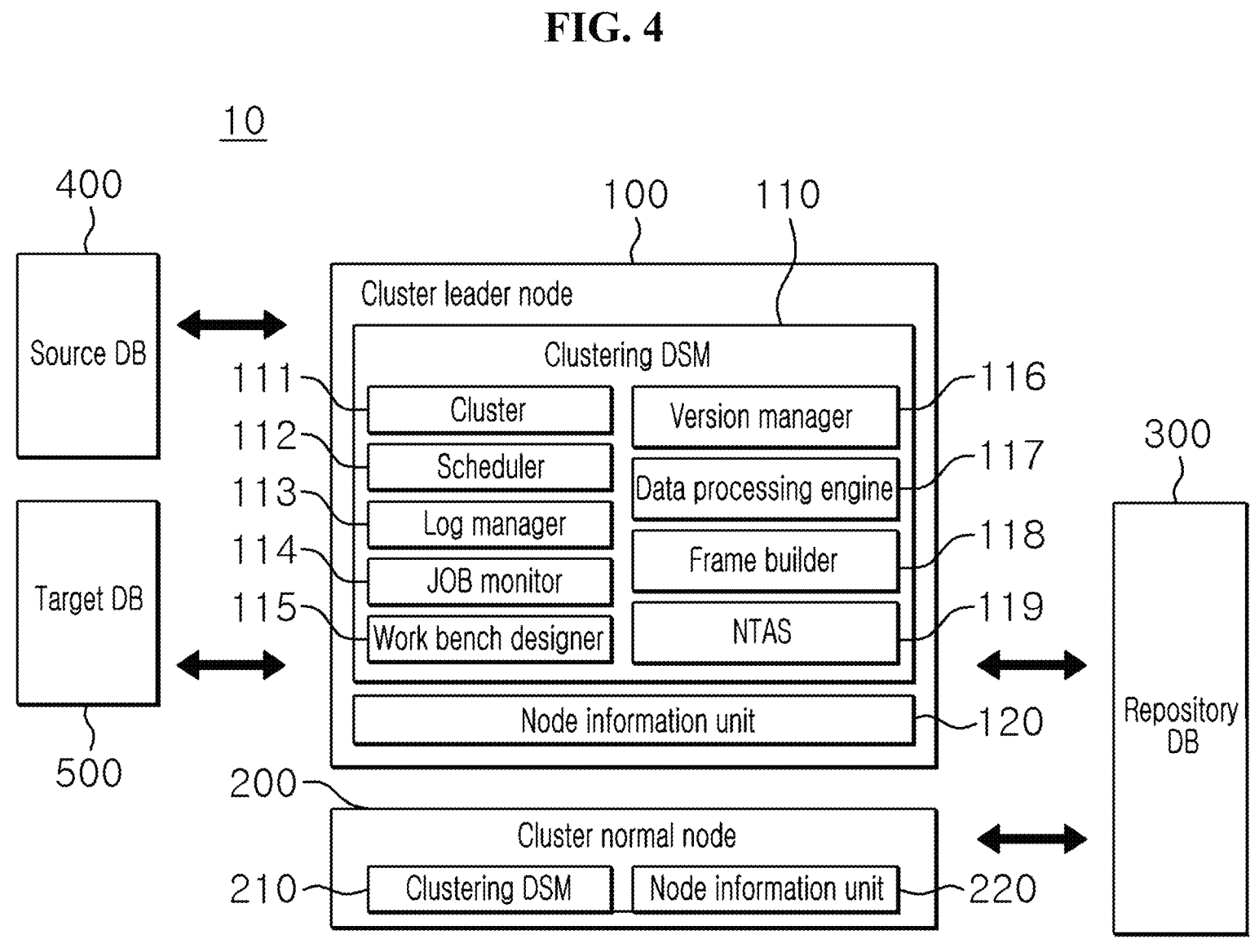

FIG. 3 is a schematic diagram of a dynamic clustering-based ETL JOB distributed processing system according to an embodiment of the present disclosure, and FIG. 4 is a schematic structural diagram of a dynamic clusters-based ETL JOB distributed processing systems according to embodiments of the present disclosure.

Referring to FIGS. 3 and 4, the dynamic clustering-based ETL JOB distributed processing system 10 includes a cluster leader node 100, a plurality of cluster normal nodes 200 (200a, 200b, and 200N), a repository DB 300, a source DB 400, and a target DB 500.

The cluster leader node 100 includes a clustering DSM 110 and a node information unit 120, and the clustering DSM 100 includes a cluster 111, a scheduler 112, a log manager 113, a JOB monitor 114, a work bench designer 115, a version manager 116, a data processing engine 117, a frame builder 118, and an NTAS 119. Here, DSM stands for Data Sync Manager.

The cluster 111 may serve as at least one of data communication management, node management, leader selection, distribution management, and synchronization management for clustering. The cluster 110 may manage data communication through message passing and communication functions. This enables session integration management for all nodes in a network environment without a Layer 4 switch. In addition, the cluster 111 is capable of node management including addition, deletion, and management in the event of failure of the cluster normal node 200 through a function of managing clustering node information. In addition, the cluster 111 may select the cluster leader node 100 through a function of automatically re-selecting a leader node from among the plurality of cluster normal nodes 200 when a failure occurs in the cluster leader node 110.

The cluster 111 may also distribute the ETL JOB according to a job distribution policy setting. At this time, the cluster 111 may call one of the plurality of cluster normal nodes 200 including the cluster leader node 100 to distribute the ETL JOB according to a predefined condition. In addition, the cluster 111 may perform single or mixed operation support functions such as cyclic distribution, node evaluation, and server failure frequency. In this case, the evaluation element used when the cluster 111 evaluates the node may be, but is not limited to, at least one of the number of CPUs, the memory capacity, and the number of concurrent JOB settings. In addition, the cluster 111 may perform a synchronization management function of preventing data inconsistency through synchronization of all cluster normal nodes (the cluster leader node 100 and a plurality of cluster normal nodes 200).

The scheduler 112 is a batch scheduler function and is capable of performing detailed scheduling control in units of seconds. The scheduler 112 may cause the preset schedule to be executed only in the cluster leader node 100 among the cluster leader node 110 and the plurality of cluster normal nodes 200. In addition, the scheduler 112 may invoke and manage a schedule corresponding to the ETL JOB distributed to the plurality of cluster normal nodes 200.

When the ETL JOB is executed, the log manager 113 may manage comprehensive log information including the number of processing events, successes, failures, warnings, and the like as an execution result. The log manager 113 may manage the log information so that the JOB processing results of the cluster leader node 100 and the plurality of cluster normal nodes 200 may be collectively managed in the common repository DB 300 to check the log position of the node in which the error has occurred, as well as the order of the log order error that occurs when managing the log information in each server. In addition, the log manager 113 may also integrate and manage a clustering log in which the cluster 110 distributes an ETL JOB to the cluster normal node 200 to invoke a schedule. In an embodiment, the log manager 113 may store an identifier of at least one of a name and an IP of a node on which the ETL JOB is executed in the log.

The JOB monitor 114 may monitor and control the ETL JOB and task currently being performed by the cluster lead node 100 and the plurality of cluster normal nodes 200. The JOB monitor 114 enables real-time querying of the ETL JOB being executed in the entire cluster normal node (the cluster leader node 100 and the plurality of cluster normal nodes 200), and also manages information of the node being actually executed.

The work bench designer 115 may support a task of visually designing a data flow and a work flow.

The version manager 116 may function to support version management and collaboration.

The data processing engine 117 may be a core engine that supports various tasks such as DB, File, Sorter, LDAP, and BigData by performing data processing.

The Frame Builder 118 may be a user interface framework.

The network transaction application server (NTAS 119) may be server middleware.

The node information unit 120 may be, but is not necessarily limited to, information corresponding to a cluster leader node among table list information of all cluster normal nodes stored in the repository DB 300.

The cluster normal node 200 includes a clustering DSM 210 and a node information unit 220.

The clustering DSM 210 has the same configuration as that of the clustering DSM 110 constituting the cluster leader node 100, and when a failure occurs in the cluster leader node 110, the cluster leader node 110 may be selected from among a plurality of cluster normal nodes 200 according to a cluster leader node 100 selection method to perform a role of the cluster leader node. Since the clustering DSM 210 of the plurality of cluster normal nodes 200 has the same configuration as that of the clustering DSM 110 constituting the cluster leader node 100, all the cluster normal nodes can serve as both the cluster leader node and the cluster normal nodes, and have a dynamic clustering structure.

The node information unit 220 may be, but is not necessarily limited to, information corresponding to a cluster normal node among table list information of all cluster normal nodes stored in the repository DB 300.

The repository DB 300 is a meta storage DB, and may be a database that stores all information of all cluster normal nodes (cluster leader node 100 and a plurality of cluster normal nodes 200) participating in clustering. The repository DB 300 may store solution meta information including schedule information of the clustering DSM 110, 210, and the like. The repository DB 300 may store meta-information related to the clusters 111 of the clustering DSM 110 and 220. All the cluster normal nodes may check the repository DB 300 to identify the node.

The source DB 400 may refer to a database in which source data on which the ETL JOB is to be performed is stored, and the target DB 500 may refer to a data on which the conversion is completed after the ETL JOB is completed.

While the invention has been described with reference to the embodiments shown in the drawings, this is for illustrative purposes only and it will be understood by those skilled in the art that various modifications and equivalent arrangements may be made therefrom. Therefore, the true technical protection scope of the present invention should be defined by the technical spirit of the appended claims.

What is claimed is:

1. An ETL JOB distributed processing method based on dynamic clustering, comprising:

extracting data from a source DB by a cluster leader node;

distributing, by the cluster leader node, ETL (Extract, Transform, Load) JOBs to a plurality of cluster normal nodes based on the extracted data;

processing the ETL JOB by the plurality of cluster normal nodes upon a call from the cluster leader node; and loading the ETL JOB processed by the cluster leader node and the plurality of cluster normal nodes into a target DB;

wherein the cluster leader node includes a clustering DSM (Data Sync Manager), the clustering DSM manages data communication for clustering, manages nodes, performs ETL JOB distribution management and synchronization management, and automatically re-selects the leader node upon a failure of the cluster leader node, wherein, to determine the failure of the cluster leader node, a cluster normal node inquires a cluster leader IP from a repository DB and receives a response, attempts to ping the cluster leader node using a received IP, and confirms normal operation if the ping response is valid, and updates the repository DB to set itself as the new cluster leader node and updates the cluster leader IP in the repository DB to its own IP if the ping response indicates failure, wherein attempting to ping the cluster leader node comprises:

the cluster normal node pinging the cluster leader node a predetermined number of times, and if the received ping response of the cluster leader IP is not an error, the cluster normal node confirming the normal operation of the cluster leader node, wherein each of the plurality of cluster normal nodes includes a clustering DSM, the clustering DSM has the same configuration as that of the clustering DSM of the cluster leader node and, when a failure occurs in the cluster leader node, one of the cluster normal nodes is selected as a new cluster leader node in accordance with a leader selection method and performs the role of the cluster leader node, wherein the clustering DSM comprises: a cluster; a scheduler; a log manager; a JOB monitor; a work bench designer; a version manager; a data processing engine; a frame builder; and an NTAS (network transaction application server), the log manager manages comprehensive log information including execution results during ETL JOB execution, and the JOB monitor allows real-time monitoring of ETL JOBs being executed by the cluster leader node and the plurality of cluster normal nodes and manages information about the node that is actually executing the JOB, the cluster:

manages data communication through message passing and communication functions enabling session integration management for all nodes in a network environment without a Layer 4 switch;

performs node management including addition, deletion, and management in the event of failure of the cluster normal node through a function of managing clustering node information;

selects the cluster leader node through a function of automatically re-selecting a leader node from among the plurality of cluster normal nodes when a failure occurs in the cluster leader node;

distributes the ETL JOB according to a predetermined job distribution policy setting, wherein the cluster calls one of the plurality of cluster normal nodes including the cluster leader node to distribute the ETL JOB according to a predefined condition;

performs single and mixed operation support functions such as cyclic distribution, node evaluation, and server failure frequency, wherein an evaluation element used when the cluster evaluates a node includes a number of CPUs, a memory capacity and a number of concurrent JOB settings; and performs a synchronization management function of preventing data inconsistency through synchronization of all cluster normal nodes, the scheduler:

is a batch scheduler function performing scheduling control in units of seconds, the scheduler;

causes a preset schedule to be executed only in the cluster leader node among the cluster leader node and the plurality of cluster normal nodes; and invokes and manages a schedule corresponding to the ETL JOB distributed to the plurality of cluster normal nodes.

2. The method of claim 1, wherein the log manager manages the comprehensive log information including the execution results during the ETL JOB execution, such that JOB processing results of the cluster leader node and the plurality of cluster normal nodes are collectively managed in the repository DB in order to check log positions of a node in which the error has occurred and an order of a log order error that occurs when managing log information in each server, the log manager further integrates and manages a clustering log in which the cluster distributes the ETL JOB to the cluster normal node to invoke the schedule, and the log manager stores an identifier of at least one of a name and an IP of a node on which the ETL JOB is executed in the log.

3. The method of claim 1, wherein the repository DB is a meta storage DB and stores all information of all cluster normal nodes participating in clustering, the repository DB further stores solution meta information including schedule information of the clustering DSM, and the repository DB further stores meta-information related to the clusters of the clustering DSM, and all the cluster normal nodes checks the repository DB to identify a node.

4. An ETL JOB distributed processing system based on dynamic clustering, comprising:

a cluster leader node configured to receive data extracted from a source DB and to distribute ETL (Extract, Transform, Load) JOB to a plurality of cluster normal nodes;

a plurality of cluster normal nodes configured to process ETL JOB upon a call from the cluster leader node; and a repository DB configured to store the ETL JOB processed by the cluster leader node and the plurality of cluster normal nodes;

wherein the cluster leader node includes a clustering DSM (Data Sync Manager), the clustering DSM manages data communication for clustering, manages nodes, performs ETL JOB distribution management and synchronization management, and automatically re-selects the leader node upon a failure of the cluster leader node, wherein, to determine the failure of the cluster leader node, a cluster normal node inquires a cluster leader IP from a repository DB and receives a response, attempts to ping the cluster leader node using a received IP, and confirms normal operation if the ping response is valid, and updates the repository DB to set itself as the new cluster leader node and updates the cluster leader IP in the repository DB to its own IP if the ping response indicates failure, wherein attempting to ping the cluster leader node comprises:

the cluster normal node pinging the cluster leader node a predetermined number of times, and if the received ping response of the cluster leader IP is not an error, the cluster normal node confirming the normal operation of the cluster leader node, wherein each of the plurality of cluster normal nodes includes a clustering DSM, the clustering DSM has the same configuration as that of the clustering DSM of the cluster leader node and, when a failure occurs in the cluster leader node, one of the cluster normal nodes is elected as a new cluster leader node in accordance with a leader election method and performs the role of the cluster leader node, wherein the clustering DSM comprises: a cluster; a scheduler; a log manager; a JOB monitor; a work bench designer; a version manager; a data processing engine; a frame builder; and an NTAS (network transaction application server), the log manager manages comprehensive log information including execution results during ETL JOB execution, the JOB monitor allows real-time monitoring of ETL JOBs being executed by the cluster leader node and the plurality of cluster normal nodes and manages information about the node that is actually executing the JOB, the cluster:

manages data communication through message passing and communication functions enabling session integration management for all nodes in a network environment without a Layer 4 switch;

performs node management including addition, deletion, and management in the event of failure of the cluster normal node through a function of managing clustering node information;

selects the cluster leader node through a function of automatically re-selecting a leader node from among the plurality of cluster normal nodes when a failure occurs in the cluster leader node;

distributes the ETL JOB according to a predetermined job distribution policy setting, wherein the cluster calls one of the plurality of cluster normal nodes including the cluster leader node to distribute the ETL JOB according to a predefined condition;

performs single and mixed operation support functions such as cyclic distribution, node evaluation, and server failure frequency, wherein an evaluation element used when the cluster evaluates a node includes a number of CPUs, a memory capacity and a number of concurrent JOB settings; and performs a synchronization management function of preventing data inconsistency through synchronization of all cluster normal nodes, the scheduler:

is a batch scheduler function performing scheduling control in units of seconds, the scheduler;

causes a preset schedule to be executed only in the cluster leader node among the cluster leader node and the plurality of cluster normal nodes; and invokes and manages a schedule corresponding to the ETL JOB distributed to the plurality of cluster normal nodes.

* * * * *